United States Patent Office 3,275,408
Patented Sept. 27, 1966

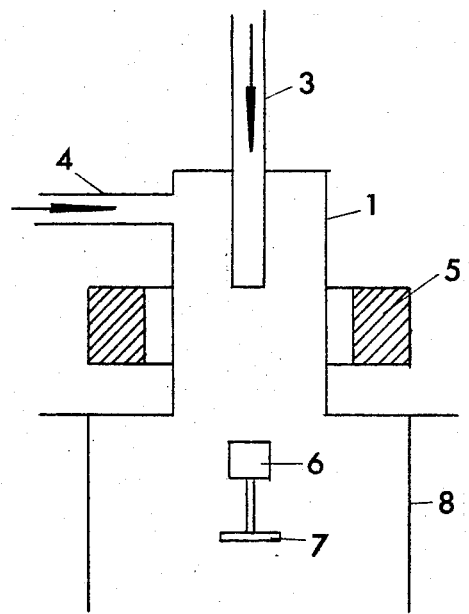

3,275,408
METHODS FOR THE PRODUCTION OF
VITREOUS SILICA
John Alexander Winterburn, Tynemouth, North Shields, Northumberland, England, assignor to The Thermal Syndicate Limited, Wallsend, Northumberland, England, a British company
Filed Jan. 6, 1964, Ser. No. 335,848
Claims priority, application Great Britain, Jan. 29, 1963, 3,543/63
16 Claims. (Cl. 23—182)

It is known that a mass of vitreous silica may be formed by applying finely divided silica to a body held at such a temperature that the silica particles are fused at the surface of the body. The silica can be in the form of grains of quartz sand, crushed quartz crystal or particles of chemically prepared silica. The heating can be done for example by flames, an electric arc or electric resistance if the body conducts electricity.

Furthermore, it is known that a mass of vitreous silica may be formed by vaporising a hydrolysable compound of silicon into a flame of combustible gas and oxygen, so as to form a flame containing silica vapour and/or finely comminuted silica, impinging or projecting the flame on to a heated body, in such a manner that a mass of transparent vitreous silica is built up upon the said body, the heat for the hydroysis of the silicon compound and fusion of the silica being provided by the aforesaid flame.

The mass of vitreous silica formed in the last mentioned manner can be made almost completely free from metallic and other impurities by selection of a suitable hydrolysable silicon compound and the resultant product has much greater transparency to ultraviolet radiation than vitreous silica made by fusing natural raw materials such as quartz crystal. However, a serious disadvantage of the material made in this way is that it can contain as much as 0.14% w./w. of hydroxyl groups, usually referred to as "water" and this results in undesirable absorption bands in the infrared at 1.4, 2.2 and 2.7 microns wave-lengths, rendering the material unsuitable for optical use in this part of the spectrum.

According to one feature of the present invention, a method of producing a transparent article of vitreous silica comprises vaporsing an oxidisable hydrogen-free compound of silicon into a high temperature gas stream which contains hydrogen-free elemental and/or combined oxygen so that the compound of silicon is oxidised to form finely comminuted silica or silica vapour, impinging the gas stream on to a refractory target to deposit thereon a layer of silica which is virtified to a transparent body as fast as it is deposited by heat transfer from the gas stream.

We have discovered that by using an oxidisable compound of silicon free from hydrogen and introducing it into a flame free from hydrogen, for example an oxy-cyanogen or an oxy-carbon disulphide flame, it is possible to obtain vitreous silica which is substantially free from "water" and is thus free from the undesirable absorption bands already refered to. The product produced by this method is thus comparable in this respect with that produced entirely by electrical fusion of quartz crystal or that obtained by a suitable refining treatment of a "water"— containing material. Throughout this specification the terms "free from hydrogen" or "hydrogen-free" should be understood as including not only free from hydrogen gas but also free from hydrogen-containing compounds.

Most hydrogen-free combustible gases generate, with oxygen, a flame reaction which is not sufficiently exothermic to maintain the conditions required for both the oxidation of the silicon compound and the subsequent fusion of the silica produced. Carbon monoxide is one example of such a combustible gas. Any exothermic shortcoming of a flame can, however, be overcome by electric augmentation, that is the introduction of thermal energy into the flame by the utilisation of electrical energy. A first method of electric augmentation is through the use of a high frequency, high energy electrodeless plasma torch. A second method of electric augmentation is through the use of resistive heating of the flame itself by an electric current passing between two electrodes immersed in the flame. The latter method can use electric power from the mains, through a suitable step up transformer and control gear, but can also be made to function at any frequency from zero to many megacycles per second.

According to a further feature of this invention, therefore, a method of producing vitreous silica comprises the steps of supplying electrical energy to a gas stream formed from an oxidisable hydrogen-free silicon compound and oxygen or oxygen-containing gas free from hydrogen to provide a gas stream having a temperature sufficient to oxidise the silicon compound to silica, impinging the gas stream on a refractory target and collecting the silica so formed from the stream as a transparent vitreous mass.

The temperature of the gas stream may be high enough to form silica vapour or the temperature may be sufficient to form finely comminuted fused silica particles entrained in the stream.

The refractory target, or bait piece may be a piece of vitreous silica.

The gas stream may comprise a combustible hydrogen-free gas so that a proportion of the thermal energy required for the method is derived from the exothermic reaction between the combustible gas and oxygen. The silicon compound may be, for example, suitably purified silicon tetrachloride.

According to a still further feature of the present invention, a method of producing vitreous silica comprises passing a stream of oxygen or oxygen-containing gas free from hydrogen through an induction-coupled plasma torch, adding to the stream an oxidisable hydrogen-free silicon compound and collecting the silica oxidised from the silicon compound as a transparent vitreous mass on a bait piece.

The silicon compound may be added to the gas stream before or after the latter passes through the plasma torch.

The plasma torch may comprise a silica burner tube surrounded by an induction coil, and the stream of oxygen or oxygen-containing gas may be passed with the silicon compound through the tube and thereby subjected to the influence of a high frequency electric discharge generated along the axis of the coil.

By suitably adjusting the frequency and power input to the coil, a "flame" temperature in the plasma leaving the silica tube has been generated, which is sufficient to oxidise the silicon compound to silica and to cause the silica formed in this way to be deposited almost simultaneously on the bait piece.

Preferably, the gas stream, prior to the addition of the silicon compound contains 50 to 100% v./v. of elemental oxygen.

The novel features which are considered as characteristic for the invention are set forth in particular in the appended claims. The invention itself, however, both as to its construction and its method of operation, together with additional objects and advantages thereof, will be best understood from the following description of specific embodiments when read in connection with the accompanying drawings, in which the figure is a schematic, elevational view of a device for carrying out the method of the present invention.

Referring now to the drawing, it will be seen that the same illustrates a plasma torch arrangement comprising a "burner" 1, surrounded by a four turn coil 5. Reference numeral 4 illustrates an inlet for pure oxygen gas, and reference numeral 3 an inlet for oxygen gas plus silicon tetrachloride.

The bail piece 6 is supported on a rotating stand 7 in a container 8.

The following examples are given as illustrative only, without limiting the invention to the specific details of the examples.

*Example 1*

A stream of gas consisting of 3 parts by volume of oxygen and 2 parts by volume of argon is fed into a high frequency induction plasma torch schematically shown in the accompanying drawing, part of the oxygen stream having previously been saturated with silicon tetrachloride vapour at room temperature. The plasma torch comprises a "burner" 1 of vitreous silica surrounded by a four-turn coil 5 fed with 15 kilowatts of electric power at a frequency of 12 megacycles per second. The electrical breakdown of the gas stream is initiated in the known manner and the tip of the resulting plasma of 1" diameter maintained 1½" away from a vitreous silica bait piece 6.

Very high purity silica resulting from the oxidation of the silicon tetrachloride is deposited as a transparent vitreous mass on the bait piece.

*Example 2*

A stream of oxygen gas saturated with silicon tetrachloride vapour at room temperature is fed into a high frequency induction plasma torch. The plasma torch consists of a burner of vitreous silica surrounded by a tightly coupled five-turn coil fed with 24 kilowatts of electric power at a frequency of 10 megacycles per second. The electrical breakdown of the gas stream is initiated in the known manner and the tip of the resulting plasma of 1" diameter is maintained 3 inches away from a vitreous silica bait piece.

Very high purity silica resulting from the oxidation of the silicon tetrachloride is deposited on the silica bait piece as a transparent vitreous mass.

*Example 3*

A stream of oxygen gas partially saturated with silicon tetrachloride at room temperature is passed at 2.5 cubic metres per hour into a burner to which is also fed carbon disulphide vapour at 1 cubic metre per hour. The burner is maintained above the boiling point of carbon disulphide in order to prevent condensation. The flame produced by the ignition of the gases is sufficiently hot both to oxidise the silicon tetrachloride to silica and to fuse the resultant silica to a transparent mass when a vitreous silica bait piece is placed in the flame.

*Example 4*

Two streams of oxygen gas, one saturated with silicon tetrachloride at room temperature and one passed over heated sodium chloride are fed to a vitreous silica burner to which is also fed carbon monoxide. The flame produced by the ignition of the gases is sufficiently hot to oxidise the silicon tetrachloride to silica but not to fuse the product into a vitreous mass when a silica bait piece is placed in the flame. The burner used has two graphite tubes separated along the length of the flame and coaxial with it. When high voltage 50 c./s. A.C. is applied between these electrodes current flows through the flame and with a dissipation of 5 kva. the flame is sufficiently hot to fuse the silica produced in the flame to a transparent vitreous mass.

In each of the above examples care is taken to ensure that the gases and the SiCl$_4$ are hydrogen free. In particular the gases are dried by refrigeration to remove all traces of moisture and the silicon tetrachloride is examined for freedom from hydrogen containing compounds such as trichlorosilane and methyl trichlorosilane.

The sodium chloride is required in order to increase the conductivity of the flame, but the amount of this addition which appears in the silica produced is not sufficient to have a deleterious effect on its transmission.

Subsequent fashioning of the mass of vitreous silica produced by the method according to the invention, and fabrication into useful articles are carried out by methods well known in the art.

What is claimed is:

1. A method of producing a transparent body of vitreous, hydrogen-free silica, comprising the steps of forming an oxygen-containing, hydrogen-free gas stream having distributed therethrough a substance selected from the group consisting of silicon and oxidizable, vaporizable, hydrogen-free silicon compounds, said gas stream being at a sufficiently high temperature to vaporize said substance and to oxidize the same under formation of silica and to maintain the thus-formed silica at at least its fusing temperature; directing the thus-formed silica-containing gas stream against a refractory support so as to impinge thereon and to deposit said silica on the same in the form of a body of fused, hydrogen-free, transparent, vitreous silica.

2. A method of producing a transparent body of vitreous, hydrogen-free silica, as defined in claim 1, wherein said substance is silicon tetrachloride.

3. A method of producing a transparent body of vitreous, hydrogen-free silica, as defined in claim 1, and including the step of recovering said body of fused, hydrogen-free, transparent, vitreous silica from said refractory support.

4. A method of producing a transparent body of vitreous, hydrogen-free silica, as defined in claim 1, wherein said silica-containing gas stream is formed by passing a stream of oxygen-containing gas free of hydrogen through an induction coupled plasma torch, and adding said substance to said stream.

5. A method of producing a transparent body of vitreous, hydrogen-free silica, as defined in claim 1, wherein said silica-containing gas stream at said sufficiently high temperature is produced by forming a stream comprising oxygen and said substance and being free of hydrogen; and supplying electric energy to the thus produced stream so as to raise the temperature thereof to said sufficiently high temperature.

6. A method of producing a transparent body of vitreous, hydrogen-free silica, as defined in claim 1, wherein said silica-containing gas stream at said sufficiently high temperature is produced by forming a stream consisting essentially of an oxygen-containing gas and said substance and being free of hydrogen; and supplying electric energy to the thus produced stream so as to raise the temperature thereof to said sufficiently high temperature.

7. A method of producing a transparent body of vitreous, hydrogen-free silica, as defined in claim 1, wherein said silica-containing gas stream at said sufficiently high temperature is produced by forming a hydrogen-free stream consisting essentially of oxygen, a hydrogen-free combustible gas and said substance, and causing combustion of said combustible substance by reaction thereof with a portion only of said oxygen; and wherein the thermal energy produced by said combustion is augmented by passing an electric current through said stream.

8. A method of producing a transparent body of vitreous, hydrogen-free silica, as defined in claim 1, wherein said silica-containing gas stream at said sufficiently high temperature is produced by forming a hydrogen-free stream consisting essentially of an oxygen-containing gas, a hydrogen-free combustible gas and said substance, and causing combustion of said combustible substance by reaction thereof with a portion only of said oxygen-containing gas; and wherein the thermal energy produced by said combustion is augmented by passing an electric current through said stream.

9. A method of producing a transparent body of vitreous, hydrogen-free silica, as defined in claim 1, wherein said silica-containing gas stream at said sufficiently high temperature is produced by forming a hydrogen-free stream consisting essentially of oxygen, a hydrogen-free combustible gas and said substance, and causing combustion of said combustible substance by reaction thereof with a portion only of said oxygen; and wherein the thermal energy produced by said combustion is augmented by passing the gas stream through an induction-coupled plasma torch.

10. A method of producing a transparent body of vitreous, hydrogen-free silica, as defined in claim 1, wherein said silica-containing gas stream at said sufficiently high temperature is produced by forming a hydrogen-free stream consisting essentially of an oxygen-containing gas, a hydrogen-free combustible gas and said substance, and causing combustion of said combustible substance by reaction thereof with a portion only of said oxygen-containing gas; and wherein the thermal energy produced by said combustion is augmented by passing the gas stream through an induction-coupled plasma torch.

11. A method of producing a transparent body of vitreous, hydrogen-free silica, as defined in claim 1, wherein said oxygen-containing, hydrogen-free gas stream, prior to distribution of said substance therethrough, contains between 50 and 100% by volume of elemental oxygen.

12. A method of producing a transparent body of vitreous, hydrogen-free silica, as defined in claim 1, wherein said gas stream contains elemental oxygen and said substance is vaporized into the same so as to form therein by reaction with said elemental oxygen finely comminuted silica, and wherein said gas stream is impinged onto a refractory support in such a manner as to deposit thereon a layer of silica which is vitrified to form a transparent body as fast as it is deposited by heat transfer from said gas stream.

13. A method of producing a transparent body of vitreous, hydrogen-free silica, as defined in claim 12, wherein said sufficiently high temperature is obtained by means of an oxy-carbon disulphide flame.

14. A method of producing a transparent body of vitreous, hydrogen-free silica, as defined in claim 12, wherein said sufficiently high temperature is obtained by means of an oxy-cyanogen flame.

15. A method of producing a transparent body of vitreous, hydrogen-free silica, as defined in claim 12, wherein said substance is silicon tetrachloride.

16. A method of producing a transparent body of vitreous, hydrogen-free silica, as defined in claim 1, wherein said gas stream contains hydrogen-free combined oxygen and said substance is vaporized into the same so as to form silica therein by reaction with said oxygen, and wherein said gas stream is impinged onto a refractory support in such a manner as to deposit thereon a layer of silica which is vitrified to form a transparent body as fast as it is deposited by heat transfer from said gas stream.

References Cited by the Examiner
UNITED STATES PATENTS

| 2,819,423 | 1/1958 | Clark. |
| 2,967,115 | 1/1961 | Herrick. |
| 3,004,137 | 10/1961 | Karlovitz. |
| 3,043,659 | 7/1962 | Hughes et al. ____ 260—765 XR |

OTHER REFERENCES

Lowry, T. Martin, Inorganic Chemistry, second edition, pages 543 and 548, London, Macmillan and Company, Limited, 1931.

OSCAR R. VERTIZ, *Primary Examiner.*

BENJAMIN HENKIN, *Examiner.*

H. S. MILLER, A. GREIF, *Assistant Examiners.*